United States Patent [19]

Sako et al.

[11] Patent Number: 4,547,311

[45] Date of Patent: Oct. 15, 1985

[54] ELECTRICALLY CONDUCTIVE COATING COMPOSITION

[75] Inventors: Junichi Sako, Suita; Norimasa Honda, Ibaraki, both of Japan

[73] Assignee: Daikin Kogyo Co., Ltd., Osaka-fu, Japan

[21] Appl. No.: 461,598

[22] Filed: Jan. 27, 1983

[30] Foreign Application Priority Data

Jan. 30, 1982 [JP] Japan ................................ 57-13960

[51] Int. Cl.$^4$ .............................................. H01B 1/06
[52] U.S. Cl. .................................... 252/511; 252/502
[58] Field of Search ............ 252/511, 502, 500, 363.5, 252/364; 524/495, 496; 106/307, 308 M, 311; 523/220

[56] References Cited

U.S. PATENT DOCUMENTS

| | | | |
|---|---|---|---|
| 3,509,088 | 4/1970 | Daton .................................. | 252/511 |
| 3,654,187 | 4/1972 | Takenaka et al. .................... | 252/511 |
| 4,265,789 | 5/1981 | Christopherson .................... | 252/511 |
| 4,351,746 | 9/1982 | Parish et al. ......................... | 524/496 |
| 4,379,871 | 4/1983 | Werle et al. ......................... | 524/495 |

*Primary Examiner*—Josephine L. Barr
*Attorney, Agent, or Firm*—Birch, Stewart, Kolasch & Birch

[57] ABSTRACT

An electrically conductive coating composition which comprises (a) a dispersion of carbon black or a mixture of carbon black and graphite in an organic solvent and (b) a solution of a polymer in an organic solvent, the viscosity of the composition being higher than those of the dispersion (a) and the solution (b) being homogeneous and stable, a coating film formed therefrom having a low volume resistivity.

10 Claims, No Drawings

ELECTRICALLY CONDUCTIVE COATING COMPOSITION

The present invention relates to an electrically conductive coating composition.

An electrically conductive coating composition, in which electrically conducting carbon black or a mixture of carbon black and graphite is dispersed in a solution of a polymer in an organic solvent, has good electrical properties and is used as an electrical part material or a constructional material in various fields.

Generally, the electrically conductive coating composition is prepared by mixing powdery carbon black or graphite and the polymer homogeneously in the organic solvent. It is, however, very difficult to disperse carbon black or graphite homogeneously and stably in the polymer solution as a composition base, since the specific gravities, particle sizes and flowability of the components are different. It is also difficult to obtain a coating film having a desired volume resistivity with good reproducibility. When the dispersion is not homogeneous, an increased amount of carbon black or graphite does not proportionally decrease the volume resistivity of the coating film.

There are known various processes for dispersing carbon black or the mixture of carbon black and graphite in the polymer solution homogeneously including a process which comprises mixing the electrically conducting material and the polymer with a twin roll or a mixer and mixing the resulting mixture in the organic solvent to obtain a coating composition, and a process which comprises mixing the electrically conducting material and the polymer in the organic solvent with a ball mill to obtain a coating composition.

In the former process, however, a coating film formed from the coating composition is not homogeneous and has a high volume resistivity, and the reproducibility is bad, since the particle sizes of carbon black and of the polymer are greatly different. When the mixture is strongly agitated with a mechanical mixer in order to disperse carbon black in the solution, the structure of electrically conductive carbon black is destroyed, and the volume resistivity of the coating film is not lowered while the components are dispersed homogeneously.

In the latter process, in which the viscosity of the mixture becomes high during mixing and a homogeneous mixture is hardly obtainable, the viscosity is lowered by lowering the concentration of the solution or the amount of the added electrically conducting material so that only a coating composition which affords a coating film having a high volume resistivity is obtained.

As a result of the extensive study to prepare a solvent base electrically conductive coating composition in which a large amount of carbon black or a mixture of carbon black and graphite (hereinafter referred to as "electrically conducting material") is dispersed homogeneously in a polymer solution, it has now been found that a mixture of a homogeneous dispersion of the electrically conducting material in an organic solvent prepared with, for example, a ball mill and a solution of a polymer in an organic solvent has desired properties.

According to the present invention, there is provided an electrically conductive coating composition which comprises (a) a dispersion of carbon black or a mixture of carbon black and graphite in an organic solvent and (b) a solution of a polymer in an organic solvent, the viscosity of the composition being higher than those of the dispersion (a) and the solution (b).

Since the electrically conducting carbon black has a great specific surface area and great oil absorption, its mixture with the polymer solution has high viscosity and it is hardly possible to obtain a homogeneous dispersion. However, in the present invention, the electrically conducting material is mixed in the organic solvent in a concentration of from 5 to 15% by weight to give a homogeneous dispersion having a low viscosity of, for example, about 100 to 5,000 cp, preferably about 100 to 2,000 cp, and the resulting dispersion is easily mixed with the polymer solution having a low viscosity of, for example, about 1,000 to 5,000 cp, preferably about 1,000 to 3,000 cp. Thus, a homogeneous dispersion of the electrically conducting material in the polymer solution is obtained. When the agitation of the dispersion is continued, the viscosity of the dispersion rises gradually and becomes, for example, about 5,000 to 100,000 cp, preferably about 6,000 to 20,000 cp, which is higher than those of the dispersion (a) or the solution (b). The coating composition of the invention has good stability and may contain a greater amount of the electrically conducting material than the conventional ones. For example, even when 10 to 200 parts by weight of the electrically conducting material to 100 parts by weight of the polymer is contained, the homogeneous coating composition is easily prepared. Thus, the volume resistivity of the coating film formed from the coating composition of the invention is very low.

Carbon black as the electrically conducting material preferably has DB oil absorption of from 100 to 400 ml/100 g and an average particle size of from 10 to 70 mμ. Specific examples of carbon black are acetylene black, furnace black, channel black, thermal black, etc. Graphite may be natural or synthetic crystalline one having a particle size of from several micron to some hundred micron. The amount of the electrically conducting material to be contained is from 10 to 60% by weight on the basis of the total weight of the coating composition.

When the mixture of carbon black and graphite is used, the weight ratio of the former to the latter varies with their total amount in the coating composition as follows:

TABLE 1

| Total amount of carbon black and graphite in the composition (% by wt.) | Weight ratio of carbon black and graphite (wt./wt.) |
| --- | --- |
| <10 | 10/0–8/2 |
| 10–20 | 9/1–6/4 |
| 20–30 | 8/2–5/5 |
| 30–40 | 7/3–3/7 |
| 40< | 6/4–1/9 |

Preferred polymers are fluoroelastomers, urethane elastomers and vinylidene fluoride/tetrafluoroethylene copolymers, and the fluoroelastomers are most preferred.

The fluoroelastomer may be a highly fluorinated elastic copolymer, preferably comprising about 40 to 85% by mol of units of vinylidene fluoride and about 60 to 15% by mol of units of at least one of other fluorine-containing ethylenically unsaturated monomers copolymerizable therewith. As the fluoroelastomer, there may be also used any fluorine-containing elastomer bearing iodine on the polymer chain, preferably an elastic copolymer which bears about 0.001 to 10% by weight, particularly about 0.01 to 5% by weight of iodine, and comprises about 40 to 85% by mol of units of vinylidene fluoride and about 60 to 15% by mol of units of at least one of other fluorine-containing ethylenically unsaturated monomers copolymerizable therewith (cf. Japanese Patent Publication (unexamined) No. 40543/1977). Specific examples of the fluorine-containing ethylenically unsaturated monomers as above stated are hexafluoropropylene, pentafluoropropylene, trifluoroethylene, trifluorochloroethylene, tetrafluoroethylene, vinyl fluoride, perfluoro(methyl vinyl ether), perfluoro(ethyl vinyl ether), perfluoro(propyl vinyl ether), etc. Among various fluoroelastomers, preferred are vinylidene fluoride/hexafluoropropylene copolymer, vinylidene fluoride/tetrafluoroethylene/hexafluoropropylene terpolymer, etc.

The organic solvent may be a lower alcohol or a lower ketone. The specific examples of alcohol are methanol, ethanol, propanol, ethylene glycol, carbitol and cellosolve. The specific examples of ketone are methyl ethyl ketone, methyl isopropyl ketone, etc. For preparing the dispersion of the electrically conducting material, isophorone, toluene, xylene, etc. may be also used in order to adjust an evaporation rate.

In addition to the above components, optional additives such as a surfactant, a curing agent, an acid acceptor, and a filler may be added to the coating composition of the invention.

The surfactant is used mainly when the electrically conducting material is dispersed in the organic solvent in order to help homogeneous dispersion. The surfactant may be any conventional one. The specific examples of the surfactant are nonionic ones (eg. sorbitan monooleate, alkylalkylolamides, etc.), anionic ones (eg. sodium salt of lauryl alcohol sulfate, etc.) and cationic ones (eg. oxyethylenedodecylamine, etc.). Higher aliphatic acid esters (eg. butyl stearate, etc.) may be also effective in dispersing the electrically conducting material homogeneously. The amount of the surfactant may be from 1 to 30% by weight, preferably from 4 to 15% by weight on the basis of the weight of the electrically conducting material.

As the curing agent, an aminosilane compound, an amine compound or a mixture thereof may be used.

Preferred examples of the aminosilane compound are γ-aminopropyltriethoxysilane, N-β-aminoethyl-γ-aminopropyltrimethoxysilane, N-(trimethoxysilylpropyl)ethylenediamine, N-β-aminoethyl-β-aminopropylmethyldimethoxysilane, γ-ureidopropyltriethoxysilane, β-aminoethyl-β-aminoethyl-γ-aminopropyltrimethoxysilane, etc.

Preferred examples of the amine compound are ones having at least one terminal amino group directly bonded to an aliphatic hydrocarbon group. The specific examples of the amino compound include monoamines (e.g. ethylamine, propylamine, butylamine, benzylamine, allylamine, n-amylamine, ethanolamine), diamines (e.g. ethylenediamine, trimethylenediamine, tetramethylenediamine, hexamethylenediamine, 3,9-bis(3-aminopropyl)-2,4,8,10-tetraoxaspiro-[5.5]undecane) and polyamines (e.g. diethylenetriamine, triethylenetetraamine, tetraethylenepentaamine, pentaethylenehexaamine). Among them, those having at least two terminal amino groups are particularly preferred.

The amount of the curing agent may be usually from 1 to 30 parts by weight, preferably from 1 to 20 parts by weight to 100 parts by weight of the polymer. When the mixture of the aminosilane compound and the amine compound is used, the total amount of them may be within the above range, the molar ratio of the former to the latter being preferably from 1:99 to 90:10.

The acid acceptor may be any conventional one as used in curing the polymer. Examples are oxides and hydroxides of divalent metals (e.g. magnesium, calcium, zinc, lead). As the filler, there may be exemplified silica, clay, diatomaceous earth, talc, etc.

The coating composition of the invention may be applied onto a substrate by a conventional procedure (e.g. brushing, dipping, spraying) and cured at a temperature usually of from room temperature to 400° C., preferably of from 100° to 400° C. for an appropriate period of time to give a coating film.

The present invention will be illustrated in detail by the following Examples.

EXAMPLE 1

A mixture of acetylene black and graphite (100 g, 7:3 by weight), magnesium oxide (5 g), methyl isobutyl ketone (395 g) and 3,9-bis(3-aminopropyl)-2,4,8,10-tetraoxaspiro-[5.5]undecane (hereinafter referred to as "V-11") (3 g) were mixed in a ball mill for 14 hours to obtain a dispersion having a viscosity of 630 cp.

A vinylidene fluoride/hexafluoropropylene/tetrafluoroethylene copolymer ("Daiel G-501" manufactured by Daikin Kogyo Co., Ltd.) (150 g) was dissolved in methyl ethyl ketone (500 g) to obtain a solution having a viscosity of 2,500 cp.

The dispersion and the solution were mixed and agitated at high speed. The viscosity rose gradually to give a coating composition having a constant viscosity of 60,000 cp. The composition was coated on a polyester film with a doctor blade and dried at 160° C. for 30 minutes to give an electrically conductive film of about 25μ thick having a volume resistivity of 0.060 Ωcm.

EXAMPLE 2

In the same manner as in Example 1 but using methyl ethyl ketone (400 g) in place of methyl isobutyl ketone, a dispersion having a viscosity of 580 cp was prepared.

Urethane rubber ("Pandex-5167" manufactured by Dainippon Ink and Chemicals, Inc.) (100 g) was dissolved in dimethylacetamide (400 g) to obtain a solution having a viscosity of 2,800 cp.

The dispersion and the solution were mixed and agitated at a high speed to give a coating composition having a viscosity of 45,000 cp. In the same manner as in Example 1, from the coating composition, an electrically conductive film of about 26μ thick having a volume resistivity of 0.068 Ωcm was formed.

Comparative Example 1

All the components used in Example 1 were added in a ball mill from the start and mixed for 18 hours. The composition had a viscosity of 45,000 cp but was not homogeneous. A film formed from the composition had a volume resistivity of 0.44 Ωcm.

Comparative Example 2

All the components used in Example 1 except the solvent were mixed with a twin roll for 30 minutes, and then the mixture was dispersed in the solvent. In the same manner as in Example 1, a coating film was formed from the dispersion. The volume resistivity of the film was 0.32 Ωcm.

EXAMPLE 3

A mixture of furnace black and graphite (150 g, 4:6 by weight), magnesium oxide (5 g) and methyl ethyl ketone (995 g) were mixed in a ball mill for 13 hours to obtain a dispersion having a viscosity of 150 cp.

A fluoroelastomer ("Daiel G-901" manufactured by Daikin Kogyo Co., Ltd.) (100 g) was dissolved in methyl ethyl ketone (300 g) to obtain a solution having a viscosity of 4,500 cp.

The dispersion and the solution were mixed in the same manner as in Example 1 to obtain a coating composition having a viscosity of 8,000 cp. A mixture of the coating composition, V-11 (3 g) and methyl ethyl ketone (3 g) was formed into a film having a volume resistivity of 0.02 $\Omega$cm.

The coating composition was homogeneous although it contained 150 parts by weight of the electrically conducting material to 100 parts by weight of the fluoroelastomer.

What is claimed is:

1. An electrically conductive coating composition which comprises (a) a dispersion of carbon black or a mixture of carbon black and graphite in an organic solvent selected from the group consisting of a lower alcohol and a lower ketone and (b) a solution of a polymer selected from the group consisting of fluoroelastomers, urethane elastomers and vinylidene fluoride/tetrafluoroethylene copolymers in an organic solvent, the weight ratio of carbon black or the mixture of carbon black and graphite to the polymer being from 0.1:1 to 1.5:1 the viscosity of the composition being higher than those of the dispersion (a) and the solution (b), the viscosity of the dispersion (a) being from 100 to 5,000 cp, and the viscosity of the solution (b) being from 1,000 to 5,000 cp.

2. The composition according to claim 1, wherein the concentration of carbon black or the mixture of carbon black and graphite in the dispersion (a) is from 5 to 15% by weight.

3. The composition according to claim 1, wherein carbon black is material selected from the group consisting of acetylene black, furnace black, channel black and thermal black.

4. The composition according to claim 1, wherein the concentration of the polymer in the solution (b) is from 10 to 30% by weight.

5. The composition according to claim 1, wherein the viscosity of the composition is higher than 5,000 cp and lower than 100,000 cp, preferably from 6,000 to 20,000 cp.

6. The composition according to claim 1, wherein volume resistivity of a film formed from the composition is from 0.3 to 0.01 $\Omega$cm.

7. The composition according to claim 1, wherein the solid content of said carbon black or said mixture of graphite and carbon black in the composition is from 10 to 40% by weight.

8. The composition of claim 1 wherein the viscosity of the dispersion (a) is from 100 to 2,000 cp, and the viscosity of the solution (b) is from 1,000 to 3,000 cp.

9. A method of producing an electrically conductive homogeneous coating composition having good reproducibility and stability and containing a large amount of electrically conductive material with a large volume resistivity which comprises forming a mixture of carbon black or a mixture of carbon black and graphite in an organic solvent selected from the group consisting of a lower alcohol and a lower ketone in a concentration of from 5 to 15% by weight to give a dispersion having a viscosity of about 100 to 5,000 cp, dissolving a polymer selected from the group consisting of fluoroelastomers, urethane elastomers and vinylidene fluroide/tetrafluoroethylene copolymers in an organic solvent to form a polymer solution having a viscosity of about 1,000 to 5,000 cp, mixing the dispersion with the polymer solution to produce a homogeneous mixture of the electrically conductive material in the polymer solution, and agitating the homogeneous mixture to increase the viscosity thereof to an amount greater than that of the dispersion and greater than that of the polymer solution.

10. The method of claim 9 wherein the viscosity of the mixture of the dispersion and the polymer solution is about 5,000 to 100,000 cp.

* * * * *